(12) United States Patent
Takada et al.

(10) Patent No.: US 10,839,840 B2
(45) Date of Patent: Nov. 17, 2020

(54) MAGNETIC DISK DEVICE HAVING MULTIPLE INDEPENDENT MOVING ACTUATORS

(71) Applicants: Kabushiki Kaisha Toshiba, Tokyo (JP); Toshiba Electronic Devices & Storage Corporation, Tokyo (JP)

(72) Inventors: Kazuya Takada, Kanagawa (JP); Jun Ichishima, Kanagawa (JP)

(73) Assignees: Kabushiki Kaisha Toshiba, Tokyo (JP); Toshiba Electronic Devices & Storage Corporation, Tokyo (JP)

(*) Notice: Subject to any disclaimer, the term of this patent is extended or adjusted under 35 U.S.C. 154(b) by 0 days.

(21) Appl. No.: 16/556,305

(22) Filed: Aug. 30, 2019

(65) Prior Publication Data

US 2020/0302961 A1   Sep. 24, 2020

(30) Foreign Application Priority Data

Mar. 19, 2019  (JP) .................................. 2019-051258

(51) Int. Cl.
| | |
|---|---|
| G11B 5/55 | (2006.01) |
| G11B 19/04 | (2006.01) |
| G11B 20/18 | (2006.01) |
| G06F 3/06 | (2006.01) |
| G11B 27/36 | (2006.01) |

(52) U.S. Cl.
CPC .......... *G11B 5/5578* (2013.01); *G06F 3/0613* (2013.01); *G06F 3/0676* (2013.01); *G11B 5/553* (2013.01); *G11B 19/041* (2013.01); *G11B 20/1816* (2013.01); *G11B 20/1883* (2013.01); *G11B 27/36* (2013.01); *G11B 2020/1826* (2013.01); *G11B 2220/2508* (2013.01)

(58) Field of Classification Search
None
See application file for complete search history.

(56) References Cited

U.S. PATENT DOCUMENTS

| | | | | |
|---|---|---|---|---|
| 5,155,845 A | * | 10/1992 | Beal ..................... | G06F 11/2058 714/6.12 |
| 5,261,058 A | * | 11/1993 | Squires ................. | G06F 3/0601 360/78.12 |
| 5,355,486 A | * | 10/1994 | Cornaby ............... | G11B 19/02 360/77.08 |
| 5,610,808 A | * | 3/1997 | Squires ................. | G06F 3/0601 700/2 |
| 6,307,705 B1 | * | 10/2001 | Anderson ............ | G11B 5/5547 360/78.04 |

(Continued)

*Primary Examiner* — Tan X Dinh
(74) *Attorney, Agent, or Firm* — White & Case LLP

(57) ABSTRACT

According to one embodiment, a magnetic disk device includes a magnetic disk, a first magnetic head and a second magnetic head that are moved independently of each other, a first controller chip, a second controller chip, and a third memory. The first controller chip includes a first processor and a first memory, and controls the first magnetic head. The second controller chip includes a second processor and a second memory, and controls the second magnetic head. Management information is stored in the third memory. The first controller chip is connected to the third memory. The second controller chip is connected to the third memory via the first controller chip. The second controller chip saves the management information into the second memory.

10 Claims, 5 Drawing Sheets

(56) References Cited

U.S. PATENT DOCUMENTS

| | | | | |
|---|---|---|---|---|
| 6,735,032 B2* | 5/2004 | Dunn | ............... | G11B 5/59633 |
| | | | | 360/31 |
| 9,830,939 B1* | 11/2017 | Hamilton | ............ | G11B 5/5578 |
| 9,880,913 B2 | 1/2018 | Abali et al. | | |
| 10,049,691 B1* | 8/2018 | Gaertner | .............. | G11B 5/5547 |
| 10,090,010 B1* | 10/2018 | Erden | ..................... | G11B 5/58 |
| 10,424,328 B1* | 9/2019 | Gaertner | .............. | G11B 5/4886 |
| 2003/0005218 A1* | 1/2003 | Takano | ................ | G06F 3/0655 |
| | | | | 711/112 |
| 2012/0275046 A1 | 11/2012 | Ehrlich | | |
| 2019/0333572 A1* | 10/2019 | Dallmann | ............ | G11C 11/4096 |

* cited by examiner

MAGNETIC DISK DEVICE HAVING MULTIPLE INDEPENDENT MOVING ACTUATORS

CROSS-REFERENCE TO RELATED APPLICATIONS

This application is based upon and claims the benefit of priority from Japanese Patent Application No. 2019-051258, filed on Mar. 19, 2019; the entire contents of which are incorporated herein by reference.

FIELD

Embodiments described herein relate generally to a magnetic disk device.

BACKGROUND

Magnetic disk devices including two or more magnetic heads and two or more actuators that can independently move the magnetic heads are known.

DETAILED DESCRIPTION

According to the present embodiment, in general, a magnetic disk device includes a magnetic disk, a first magnetic head and a second magnetic head that are moved independently of each other, a first controller chip, a second controller chip, and a third memory. The first controller chip includes a first processor and a first memory, and controls data writing and read to and from the magnetic disk via the first magnetic head. The second controller chip includes a second processor and a second memory, and controls data writing and read to and from the magnetic disk via the second magnetic head. Management information is stored in the third memory. The first controller chip is connected to the third memory. The second controller chip is connected to the third memory via the first controller chip. The second controller chip saves the management information into the second memory.

Exemplary embodiments of a magnetic disk device will be explained below in detail with reference to the accompanying drawings. The following embodiments are merely exemplary and not intended to limit the scope of the present invention.

Figure 1:
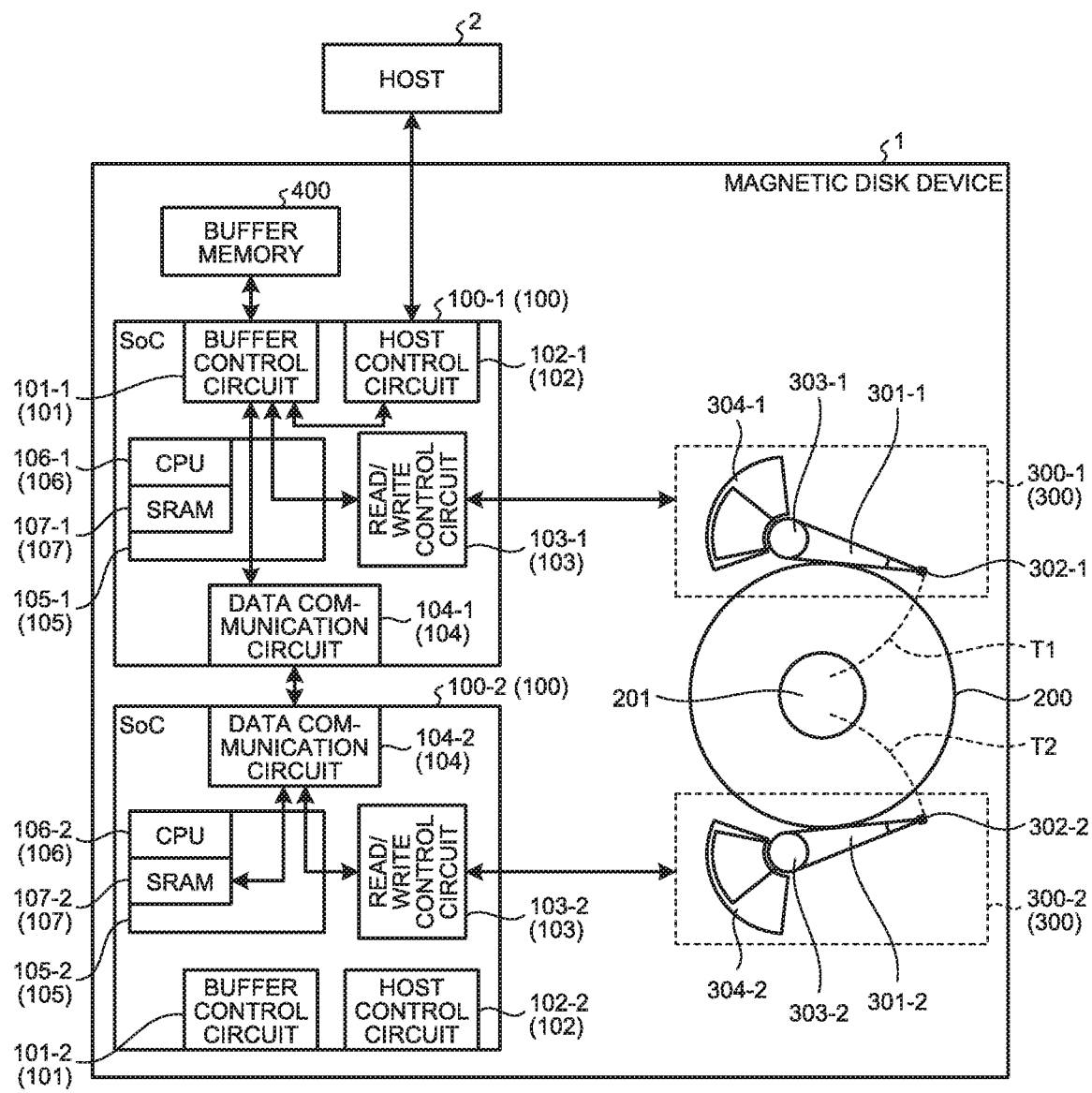
FIG. 1 is a diagram illustrating an example of a configuration of a magnetic disk device according to an embodiment.

FIG. 1 is a diagram illustrating an example of a configuration of a magnetic disk device 1 according to an embodiment. The magnetic disk device 1 is connectable to a host 2. A standard for a communication path between the magnetic disk device 1 and the host 2 is not limited to a specific standard. As an example, a serial attached SCSI (SAS) can be adopted.

The host 2 represents, for example, a processor, a personal computer, or a server. The magnetic disk device 1 can receive access commands, i.e., read commands and write commands, from the host 2.

The magnetic disk device 1 includes a magnetic disk 200 that rotates around a rotation axis 201 of a spindle motor (not illustrated). The magnetic disk device 1 can include two or more magnetic disks 200.

Figure 2:
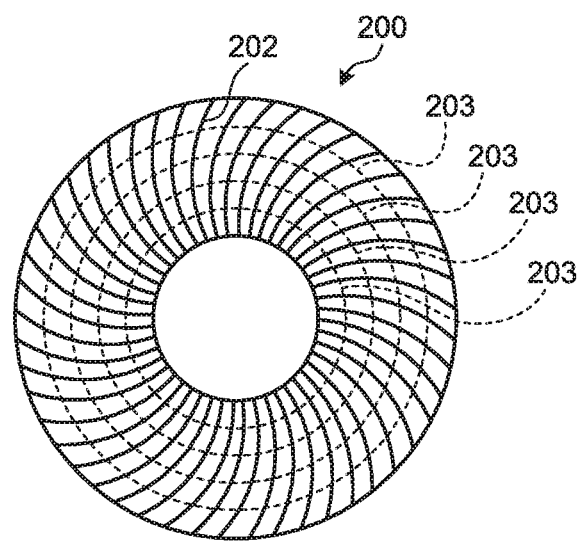
FIG. 2 is a diagram illustrating an example of a configuration of a magnetic disk according to the embodiment.

FIG. 2 is a diagram illustrating an example of a configuration of the magnetic disk 200 according to the embodiment. The magnetic disk 200 includes a magnetic material on its surface, to which servo information is written with a servo writer before shipment. The servo information is a burst pattern, for example. FIG. 2 illustrates radially-arranged servo zones 202 to which servo information is written, as an exemplary servo zone arrangement. The magnetic disk 200 includes a plurality of concentric tracks 203 arranged at a given pitch in a radial direction. Each of the tracks 203 includes a large number of consecutive sectors on the circumference. Each sector includes a magnetic region and is data-rewritable. The tracks 203 each including a large number of sectors form a data-recordable recording surface.

Referring back to FIG. 1, the magnetic disk device 1 includes a plurality of read/write systems 300 that can independently read and write data from and to the magnetic disk 200. In the present embodiment, as an example, the magnetic disk device 1 includes two read/write systems 300-1 and 300-2. The magnetic disk device 1 can include three or more read/write systems 300.

The read/write system 300-1 includes an arm 301-1, a magnetic head 302-1, a shaft 303-1, and an actuator 304-1.

The magnetic head 302-1 is attached to the leading end of the arm 301-1. The magnetic head 302-1 writes or reads a signal corresponding to data to or from the magnetic disk 200.

The actuator 304-1 is a voice coil motor (VCM), for example. By rotating the arm 301-1 around the shaft 303-1, the actuator 304-1 can move the magnetic head 302-1 with respect to the surface of the magnetic disk 200. FIG. 1 depicts a locus T1 of the magnetic head 302-1 by way of example.

The read/write system 300-2 includes an arm 301-2, a magnetic head 302-2, a shaft 303-2, and an actuator 304-2.

The magnetic head 302-2 is attached to the leading end of the arm 301-2. The magnetic head 302-2 writes or reads a signal corresponding to data to or from the magnetic disk 200.

The actuator 304-2 is a VCM, for example. By rotating the arm 301-2 around the shaft 303-2, the actuator 304-2 can move the magnetic head 302-2 with respect to the surface of the magnetic disk 200. FIG. 1 depicts a locus T2 of the magnetic head 302-2 by way of example.

According to the magnetic disk device 1, the read/write system 300-1 and the read/write system 300-2 can concurrently access the magnetic disk 200, enhancing data throughput as compared with only one read/write system 300.

The shaft 303-1 and the shaft 303-2 may be a common shaft. In other words, the arm 301-1 and the arm 301-2 may be attached to the same shaft at different axial positions to be able to rotate around the shaft. The arm 301-1 and the arm 301-2 are attached to different axial positions of the same shaft, so that the magnetic head 302-1 and the magnetic head 302-2 can read and write signals from and to different recording surfaces.

For example, the magnetic head 302-1 is configured to access one of the front surface and the rear surface of the magnetic disk 200, and the magnetic head 302-2 is configured to access the other of the front surface and the rear surface of the magnetic disk 200.

The number of magnetic heads of each of the read/write systems 300 is not limited to one. For example, the following configuration can be adopted. The magnetic disk device 1 includes N (N is an integer of two or more) magnetic disks 200. The read/write system 300-1 includes N magnetic heads 302-1 and the read/write system 300-2 includes N magnetic heads 302-2. The arm 301-1 and the arm 301-2 are attached to different axial positions of the same shaft, to rotate around the shaft. The N magnetic heads 302-1 of the read/write system 300-1 access N recording surfaces among the total 2*N recording surfaces of the N the magnetic disks 200. The N magnetic heads 302-2 of the read/write system 300-2 access N recording surfaces different from the N recording surfaces accessed by the N magnetic heads 302-1 of the read/write system 300-1, among the 2*N recording surfaces.

The magnetic head 302-1 is an exemplary first magnetic head. The magnetic head 302-2 is an exemplary second magnetic head.

The magnetic disk device 1 further includes a buffer memory 400. The buffer memory 400 is accessible at higher speed than the magnetic disk 200. The buffer memory 400 may be volatile or nonvolatile. As an example, the buffer memory 400 may be a dynamic random access memory (DRAM). The buffer memory 400 is not limited to the DRAM. The buffer memory 400 temporarily stores various kinds of information.

Figure 3:
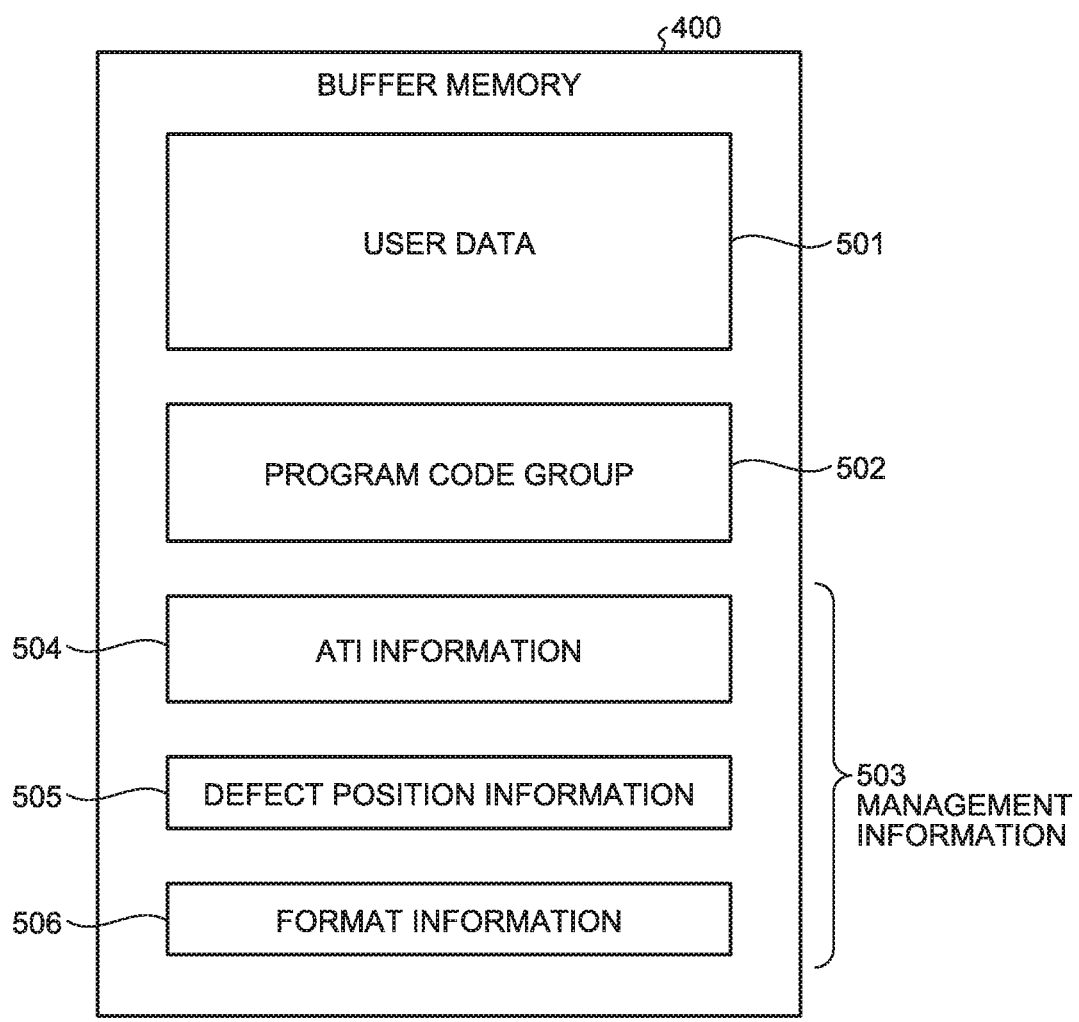
FIG. 3 is a schematic diagram illustrating an example of information stored in a buffer memory according to the embodiment.

FIG. 3 is a schematic diagram illustrating an example of information stored in the buffer memory 400 according to the embodiment. For example, the buffer memory 400 stores user data 501, a program code group 502, and management information 503.

The user data 501 is data transmitted from the host 2 to the magnetic disk device 1. The user data 501 transferred from the host 2 is written into the magnetic disk 200. The user data 501 is read from the magnetic disk 200 in accordance with a read command, and transferred to the host 2. The buffer memory 400 buffers the user data 501 to be transferred between the host 2 and the magnetic disk 200.

The program code group 502 is a code group constituting a computer program. Each code of the program code group 502 is executed by a processor (a central processing unit (CPU) 106-1 built in a SoC 100-1 or a CPU 106-2 built in a SoC 100-2).

The management information 503 includes various kinds of information necessary for maintaining the magnetic disk device 1 in a normally-operable state. The management information 503 is referred to or updated by the processor in operation.

The management information 503 includes ATI information 504, defect position information 505, and format information 506, for example. Examples of the management information 503 are not limited to such information. In this disclosure, the management information 503 does not contain the user data 501 and program codes to be executed by the CPU 106-1 and the CPU 106-2.

The ATI information 504 contains an influence of adjacent track interference (ATI) caused by writing.

In writing data to a magnetic disk, the write element of a magnetic head generates a magnetic field, which may affect tracks near the writing position and deteriorate the signal quality of the tracks. This phenomenon is known as adjacent track interference. By writing data to a location close to a location to which data has been written, the written data may become unable to read due to the adjacent track interference. The closer to the writing position the written data is, the higher the level of the influence of adjacent track interference the written data receives.

In view of this, the ATI information 504 contains an evaluation value indicating the degree of the influence of adjacent track interference for each track, for example. The evaluation value of a data-written track located near a writing position is increased. In other words, the ATI information 504 is updated upon each data writing. The next write operation is controlled such that the evaluation value of each track is to be a given value or less.

The defect position information 505 contains a position of a defect of the magnetic disk 200.

The magnetic disk 200 may include locations from which data is difficult or impossible to read due to various factors such as a variation in microscopic magnetic property, scratches, and a servo failure. Such locations are recorded in the defect position information 505 as a defect and set as non-usable. Defects include a defect occurring during operation in addition to an inherent defect detected by pre-shipment inspection. With occurrence of a defect during operation, the position of the defect is added to the defect position information 505.

Position information is typically recorded in the defect position information 505 on a sector basis. A unit of position information to be recorded in the defect position information 505 is not limited to the sector.

The format information 506 contains the track or sector arrangement. To write or read data, the format information 506 is appropriately referred to.

Referring back to FIG. 1, the magnetic disk device 1 further includes a plurality of system-on-a-chips (SoCs) 100. The SoCs 100 cooperatively function as a control system of the magnetic disk device 1.

The SoCs 100 correspond to the read/write systems 300. In the example in FIG. 1, the magnetic disk device 1 includes the SoC 100-1 connected to the read/write system 300-1 and the SoC 100-2 connected to the read/write system 300-2.

The SoC 100-1 and the SoC 100-2 may be sealed together with resin or the like to be in one package. The SoC 100-1 and the SoC 100-2 may be placed on top of each other in a thickness direction.

In the embodiment, the SoC 100-1 and the SoC 100-2 have the same hardware configuration.

For example, the SoC 100-1 and the SoC 100-2 are manufactured as the SoCs 100 of the same model number. The manufactured SoCs 100 are set to function as the SoC 100-1 or the SoC 100-2 with an external pin or through software setting.

Owing to having the same hardware configuration, the SoC 100-1 and the SoC 100-2 can be designed or manufactured in a shorter period of time than the SoC 100-1 and the SoC 100-2 to be individually designed.

In the case of changing the number of read/write systems 300 to one or three or more, a manufacturer can build up a control system for the magnetic disk device 1 including the changed number of read/write systems 300 by changing only the number of SoCs 100 in accordance with the number of read/write systems 300. This facilitates changing the control system in accordance with the change in the number of read/write systems 300.

FIG. 1 is merely a schematic diagram. In FIG. 1, for avoiding complexity of the drawing, the respective elements of the SoC 100-1 and the SoC 100-2 are differently arranged. In reality, because of the same hardware configuration of the SoC 100-1 and the SoC 100-2, the arrangements of the respective elements of the SoC 100-1 and the SoC 100-2 are identical to each other.

The SoC 100-1 and the SoC 100-2 are arranged in such a manner that a read/write control circuit 103-1 and a read/write control circuit 103-2 face in the same direction.

Each of the SoCs 100 includes a buffer control circuit 101, a host control circuit 102, a read/write control circuit 103, a data communication circuit 104, and a micro control unit (MCU) 105.

The buffer control circuit 101 serves to control access to the buffer memory 400. The host control circuit 102 serves to control communication with the host 2. The data communication circuit 104 serves to control communication with another SoC 100.

The read/write control circuit 103 serves to control data writing and read to and from the magnetic disk 200 via the read/write system 300. For example, the read/write control circuit 103 converts digital data into a signal to be supplied to the magnetic head 302, or converts a signal output from the magnetic head 302 into digital data. The read/write control circuit 103 is also referred to as a read/write channel.

Each SoC 100 may additionally include an amplifier circuit between the read/write control circuit 103 and the magnetic head 302. The read/write control circuit 103 may include a circuit that controls positioning of the actuator 304.

The MCU 105 includes a CPU 106 being a processor that can execute program codes, and a static random access memory (SRAM) 107 to be used by the CPU 106 as a cache memory.

Hereinafter, the elements of the SoC 100-1 are denoted by reference numerals with "-1" at the end while the elements of the SoC 100-2 are denoted by reference numerals with "-2" at the end.

The SoC 100-1 is an exemplary first controller chip. The SoC 100-2 is an exemplary second controller chip. The CPU 106-1 included in the SoC 100-1 is an exemplary first processor. A SRAM 107-1 included in the SoC 100-1 is an exemplary first memory. The CPU 106-2 included in the SoC 100-2 is an exemplary second processor having the same hardware configuration as the first processor. A SRAM 107-2 included in the SoC 100-2 is an exemplary second memory having the same hardware configuration as the first memory. The buffer memory 400 is an exemplary third memory.

In the embodiment, the SoC 100-1 is connected also to the host 2 and the buffer memory 400. The SoC 100-2 is connected to the buffer memory 400 via the SoC 100-1.

In the SoC 100-1, a buffer control circuit 101-1 and a host control circuit 102-1 cooperatively transfer the user data 501 between the host 2 and the buffer memory 400 under the control of the CPU 106-1. The buffer control circuit 101-1 and the read/write control circuit 103-1 cooperatively transfer the user data 501 between the buffer memory 400 and the magnetic disk 200 under the control of the CPU 106-1.

The buffer control circuit 101-1 and a data communication circuit 104-1 cooperatively transfer data between the SoC 100-2 and the buffer memory 400.

By executing a given program code group, the CPU 106-1 executes the following processing, for example. The CPU 106-1 receives and interprets a command from the host 2, transfers the user data 501 between the host 2 and the buffer memory 400, and assigns accesses to the magnetic disk 200 to the read/write system 300-1 and the read/write system 300-2, and controls the access of the read/write system 300-1 to the magnetic disk 200.

When executing the various types of processing, the CPU 106-1 can access the management information 503 stored in the buffer memory 400 as appropriate. In other words, the CPU 106-1 can refer to and update the management information 503 stored in the buffer memory 400. The CPU 106-1 accesses the management information 503 stored in the buffer memory 400 via the buffer control circuit 101-1.

In the SoC 100-2, a data communication circuit 104-2 and the read/write control circuit 103-2 cooperatively transfer the user data 501 between the buffer memory 400 and the magnetic disk 200 via the read/write system 300-2 and the SoC 100-1 under the control of the CPU 106-2.

A buffer control circuit 101-2 and a host control circuit 102-2 are not used because the SoC 100-2 is directly connected to neither the buffer memory 400 nor the host 2. The CPU 106-2 may block power supply or clock supply to the buffer control circuit 101-2 or the host control circuit 102-2.

According to the given program code group, the CPU 106-2 controls the access of the read/write system 300-2 to the magnetic disk 200. To execute the control, the CPU 106-2 can appropriately access each item of management information 503 stored in the buffer memory 400. In other words, the CPU 106-2 can refer to and update each item of management information 503 stored in the buffer memory 400.

While the SoC 100-1 is directly connected to the buffer memory 400, the SoC 100-2 is connected to the buffer memory 400 via the SoC 100-1. Thus, to access the management information 503 in the buffer memory 400, the CPU 106-2 takes a longer length of time than the CPU 106-1. As a result, the SoC 100-2 delays in accessing the magnetic disk 200, which may result in deteriorating the performance of the magnetic disk device 1.

In the embodiment, for the purpose of increasing the speed at which the CPU 106-2 accesses the management information 503 in the buffer memory 400, the SoC 100-2 uses the SRAM 107-2 as a cache memory for accessing the management information 503. That is, the SoC 100-2 saves the management information 503 into the SRAM 107-2 as cached data.

Figure 4:
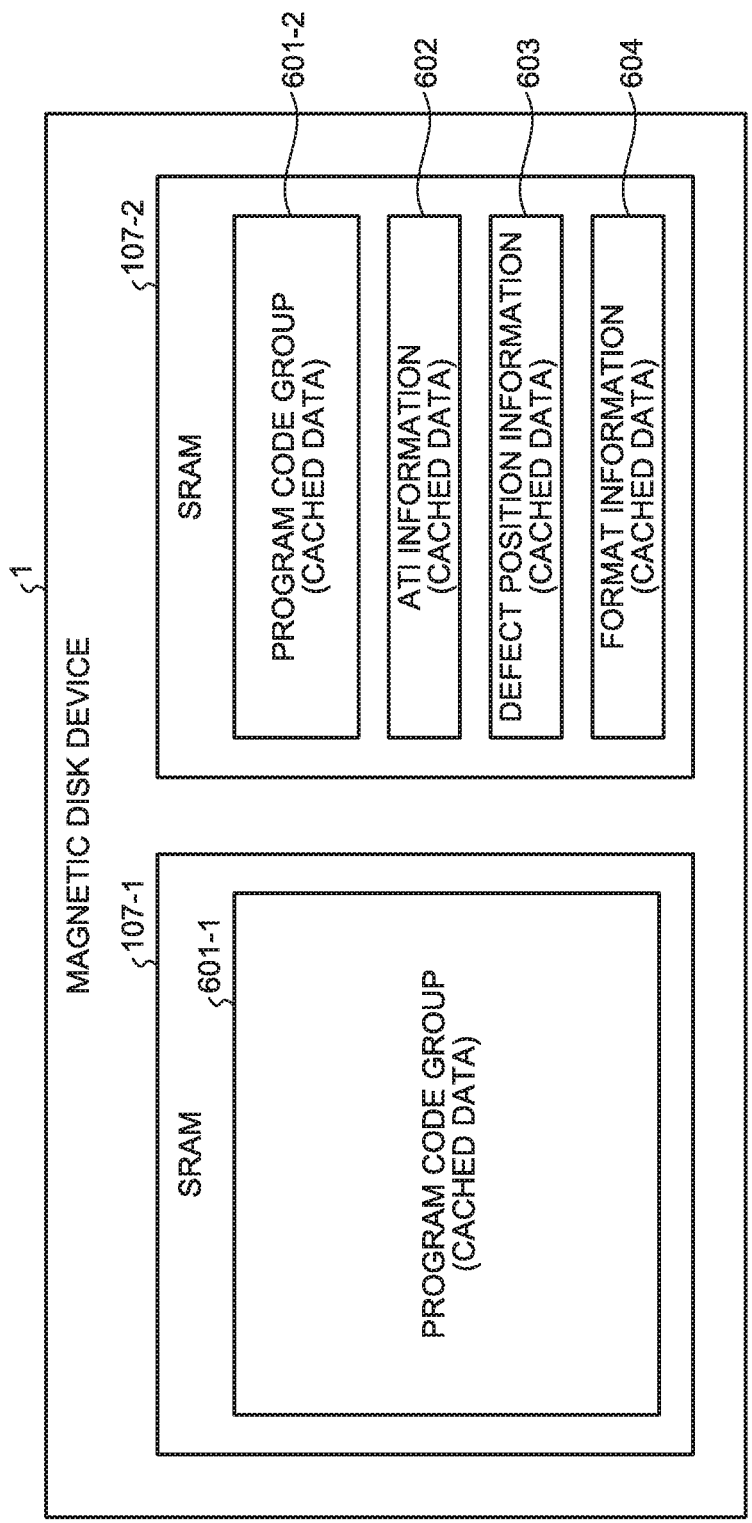
FIG. 4 is a schematic diagram illustrating an example of information stored in an SRAM of each system-on-a-chip (SoC) according to the embodiment.

FIG. 4 is a schematic diagram illustrating an example of information stored in the SRAM 107 of each of the SoCs 100 according to the embodiment.

The SRAM 107-1 contains a program code group 601-1 to be executed by the CPU 106-1 as cached data. The SoC 100-1 caches, among program code groups to be executed by the CPU 106-1, frequently-used codes and codes related to high-speed operation in the SRAM 107-1 as the program code group 601-1, and stores the rest of the codes in the buffer memory 400 as the program code group 502. The CPU 106-1 can also acquire a program code from the buffer memory 400 as necessary.

The SRAM 107-2 contains a program code group 601-2 to be executed by the CPU 106-2 as cached data. The SoC 100-2 caches, among program code groups to be executed by the CPU 106-2, frequently-used codes and codes related to high-speed operation in the SRAM 107-2 as the program code group 601-2, and stores the rest of the codes in the buffer memory 400 as the program code group 502. The CPU 106-2 can also acquire a program code from the buffer memory 400 as necessary.

As described above, the CPU 106-1 receives and interprets a command from the host 2, transfers the user data 501 between the host 2 and the buffer memory 400, and assigns access to the magnetic disk 200 to the read/write system 300-1 and the read/write system 300-2, and controls the access of the read/write system 300-1 to the magnetic disk 200, for example.

Meanwhile, the CPU 106-2 controls the access of the read/write system 300-2 to the magnetic disk 200. The CPU 106-2 executes no processing related to the buffer memory 400 and the host 2, that is, receiving and interpreting a command from the host 2, transferring the user data 501 between the host 2 and the buffer memory 400, and assigning access to the magnetic disk 200 to the read/write system 300-1 and the read/write system 300-2.

In other words, the amount of processing by the CPU 106-2 is smaller than that by the CPU 106-1. The amount of the program code group 601-2 cached in the SRAM 107-2 is smaller than that of the program code group 601-1 cached in the SRAM 107-1, by the amount corresponding to the processing not executed by the CPU 106-2.

The SoC 100-2 caches the management information 503 into a remaining storage region of the SRAM 107-2 other than the region used for the cache of the program code group 601-2. ATI information 602 illustrated in FIG. 4 is cached data of the ATI information 504. Defect position information 603 is cached data of the defect position information 505. Format information 604 is cached data of the format information 506.

The processing assigned to the CPU 106-1 and the CPU 106-2 can be arbitrarily changed. The CPU 106-1 at least receives and interprets a command from the host 2, and the CPU 106-2 receives but does not interpret a command from the host 2. The CPU 106-2 executes a less amount of processing than the CPU 106-1 at least by the amount corresponding to the interpretation of a command from the host 2. That is, the amount of the program code group 601-2 cached in the SRAM 107-2 is smaller than that in the SRAM 107-1.

In this manner, the CPU 106-2 uses the SRAM 107-2 as a cache memory for accessing the management information 503 stored in the buffer memory 400. This increases the speed at which the CPU 106-2 acquires the management information 503, leading to enhancing the performance of the magnetic disk device 1.

Specifically, at the time of using, e.g., referring to or updating, certain information in the management information 503, the CPU 106-2 first searches the SRAM 107 for the information. When a cache hit occurs, that is, when the information is cached in the SRAM 107, the CPU 106-2 uses the cached information in the SRAM 107. When a cache miss occurs, that is, when the information is not cached in the SRAM 107, the CPU 106-2 acquires and uses the information from the buffer memory 400.

When a cache hit occurs, the CPU 106-2 can acquire the management information 503 without accessing the buffer memory 400. Thus, the CPU 106-1 acquires the management information 503 at an increased speed.

The cache method applied to the SRAM 107 is not limited to a specific method. Examples of cache method may include fully-associative cache, direct mapped cache, and n-way set associative cache. The storage region of the SRAM 107 may be divided into a plurality of regions, and different methods may be applied to the divided regions.

The control over the SRAM 107 for use as a cache memory includes determining cache hit and cache miss and managing eviction, refill, and dirty/clean, for example. The CPU 106 or dedicated hardware circuitry may execute part or all of the control.

Figure 5:
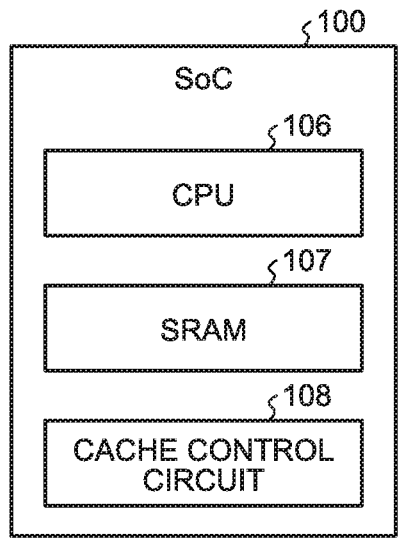
FIG. 5 is a schematic diagram of an exemplary configuration of the SoC when the SRAM according to the embodiment is used as a cache memory under the control of hardware circuitry.

FIG. 5 is a schematic diagram of an exemplary configuration of the SoC 100 when hardware circuitry controls the SRAM 107 to be used as a cache memory according to the embodiment. FIG. 5 omits showing the buffer control circuit 101, the host control circuit 102, the data communication circuit 104, and the read/write control circuit 103.

As illustrated in FIG. 5, the SoC 100 includes a cache control circuit 108 in addition to the CPU 106 and the SRAM 107. The cache control circuit 108 controls the SRAM 107 for use as a cache memory, for example.

The storage region of the SRAM 107 and the storage region of the buffer memory 400 may be mapped to different regions in an address space.

Figure 6:
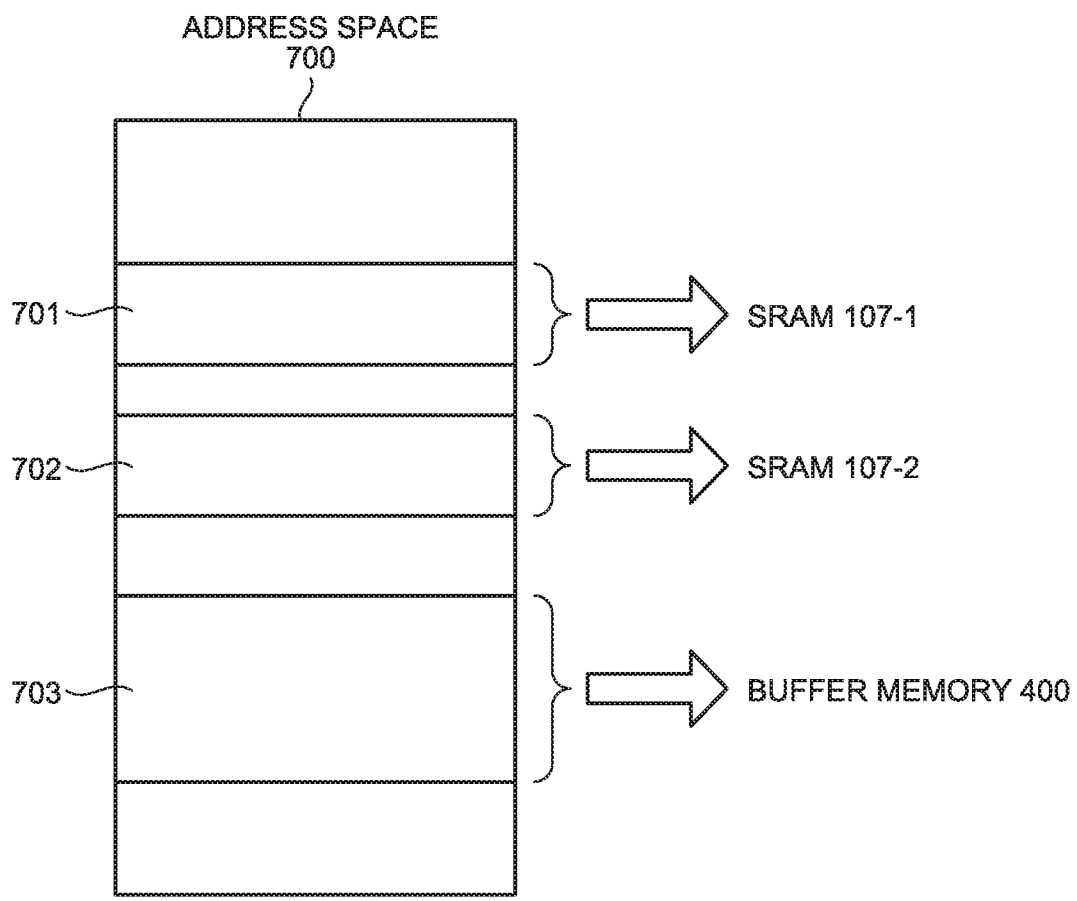
FIG. 6 is a schematic diagram of an example of mapping each storage region to an address space according to the embodiment.

FIG. 6 is a schematic diagram of exemplary mapping of each storage region to an address space according to the embodiment. As illustrated in FIG. 6, regions 701, 702, and 703 are allocated to an address space 700. Then, the storage region of the SRAM 107-1 is mapped to the region 701, the storage region of the SRAM 107-2 is mapped to the region 702, and the storage region of the buffer memory 400 is mapped to the region 703.

For example, to access the management information 503 stored in the SRAM 107-2 as cached data, the CPU 106-2 designates an access destination with an address included in the region 702. To access the management information 503 stored in the buffer memory 400 not via the SRAM 107-2, the CPU 106-2 designates an access destination with an address included in the region 703. In other words, the CPU 106-2 can switch the access to the SRAM 107-2 and the access to the buffer memory 400 with the address.

The SRAM 107 and the buffer memory 400 may not be mapped to different regions of the address space 700.

As described above, according to the embodiment, the SoC 100-1 is connected to the buffer memory 400 and the SoC 100-2 is connected to the buffer memory 400 via the SoC 100-1. The SoC 100-2 caches the management information 503 into the SRAM 107-2.

This increases the speed at which the CPU 106-2 acquires the management information 503 from the buffer memory 400, leading to enhancing the performance of the magnetic disk device 1.

The above embodiment has described the example that the SoC 100-1 does not cache the management information 503 into the SRAM 107-1. This example is not applied if the SRAM 107-1 includes a free region. For example, the SoC 100-1 may also cache the management information 503 into the SRAM 107-1.

The SoC 100-1 caches the program code group 601-1 to be executed by the CPU 106-1, into the SRAM 107-1, and the SoC 100-2 caches the program code group 601-2 to be executed by the CPU 106-2, into the SRAM 107-2. The amount of the program code group 601-2 is smaller than the amount of the program code group 601-1. The SoC 100-2 caches the management information 503 into a remaining storage region of the SRAM 107-2.

This heightens the speed at which the CPU 106-2 acquires the management information 503 from the buffer memory 400, and leads to enhancing the performance of the magnetic disk device 1.

In addition, the SoC 100-1 is connected to the host 2 and the SoC 100-2 is connected to the host 2 via the SoC 100-1. For example, the program code group 601-1 includes a program code for interpreting a command from the host 2, and the program code group 601-2 includes no program code for interpreting a command from the host 2.

Thus, the amount of the program code group 601-2 is smaller than the amount of the program code group 601-1, so that the management information 503 can be cached into a free area of the SRAM 107-2.

The storage region of the SRAM 107-2 and the storage region of the buffer memory 400 may be mapped to the different regions 702 and 703 in the address space 700. The CPU 106-2 may switch the access to the SRAM 107-2 and direct access to the buffer memory 400 with an address.

As an example, the management information 503 includes the ATI information 504 that contains influence of adjacent track interference caused by writing.

As another example, the management information 503 includes the defect position information 505 that contains a position of a defect of the magnetic disk 200.

As another example, the management information 503 includes the format information 506 that contains the track or sector arrangement.

The above embodiment has described the example that the SoC 100-1 and the SoC 100-2 have the same model number. The SoC 100-1 and the SoC 100-2 may not have the same model number.

For example, the SoC 100-1 and the SoC 100-2 have the same hardware configuration including the read/write control circuit 103, the data communication circuit 104, the CPU 106, and the SRAM 107. However, the SoC 100-1 may include the buffer control circuit 101 and the host control circuit 102, and the SoC 100-2 may not include the buffer control circuit 101 and the host control circuit 102. In this case, the SoC 100-1 and the SoC 100-2 may have different model numbers.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk device comprising:
   a magnetic disk;
   a first magnetic head and a second magnetic head that are moved independently of each other;
   a first controller chip that comprises a first processor and a first memory, and controls data writing and read to and from the magnetic disk via the first magnetic head;
   a second controller chip that comprises a second processor and a second memory, and controls data writing and read to and from the magnetic disk via the second magnetic head; and
   a third memory in which management information is stored, wherein
   the first controller chip is connected to the third memory,
   the second controller chip is connected to the third memory via the first controller chip, and
   the second controller chip saves the management information into the second memory.

2. The magnetic disk device according to claim 1, wherein the first controller chip does not save the management information into the first memory.

3. The magnetic disk device according to claim 1 or 2, wherein
   the first controller chip saves a first program code group to be executed by the first processor, into the first memory, and
   the second controller chip:
      saves a second program code group to be executed by the second processor, into the second memory, the second program code group being less in amount than the first program code group, and
      saves the management information into a remaining storage region of the second memory.

4. The magnetic disk device according to claim 3, wherein the first controller chip is connected to a host,
   the second controller chip is connected to the host via the first controller chip,
   the first program code group includes a program code for interpreting a command from the host, and
   the second program code group does not include the program code for interpreting the command from the host.

5. The magnetic disk device according to claim 1, wherein a storage region of the second memory and a storage region of the third memory are mapped to different regions in an address space, and
   the second processor switches access to the second memory and access to the third memory not via the second memory with an address.

6. The magnetic disk device according to claim 1, wherein the management information includes adjacent track interference information containing influence of adjacent track interference caused by writing.

7. The magnetic disk device according to claim 1, wherein the management information includes defect position information containing a position of a defect in the magnetic disk.

8. The magnetic disk device according to claim 1, wherein the management information includes format information containing track or sector arrangement.

9. The magnetic disk device according to claim 1, wherein the first processor and the second processor include identical hardware configurations, and
   the first memory and the second memory include identical hardware configurations.

10. The magnetic disk device according to claim 9, wherein
   the first controller chip and the second controller chip have the same model number.

* * * * *